Figure 2:
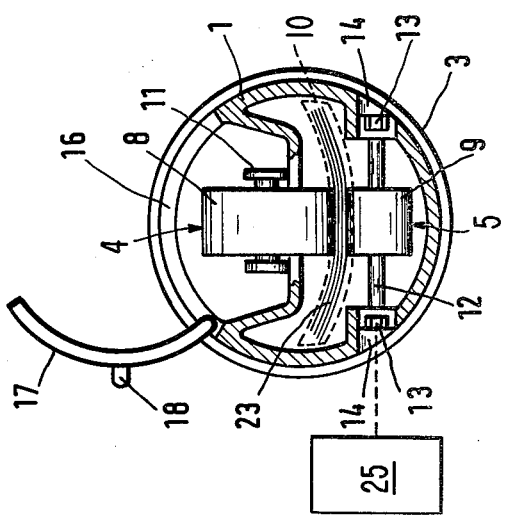

United States Patent [19]

Wuthrich

[11] Patent Number: 4,470,730
[45] Date of Patent: Sep. 11, 1984

[54] PNEUMATIC TUBE CARRIER AND PNEUMATIC TUBE CONVEYOR STATION

[75] Inventor: Werner Wuthrich, Gümligen, Switzerland

[73] Assignee: Autelca A.G., Gumligen, Switzerland

[21] Appl. No.: 364,248

[22] Filed: Apr. 1, 1982

[30] Foreign Application Priority Data

Apr. 21, 1981 [CH] Switzerland ............ 2590/81

[51] Int. Cl.³ ............................................. B65G 51/06
[52] U.S. Cl. ..................................... 406/186; 406/187
[58] Field of Search ............... 109/24.1; 194/DIG. 26; 198/472; 221/648, 191; 232/251, 43.1, 43.3, 43.4; 271/162, 272; 406/77, 184, 186, 187; 414/43

[56] References Cited

U.S. PATENT DOCUMENTS 3,101,892  8/1963  Reese, Jr. ..................... 232/43.3
4,020,972  5/1977  Lundblad ................ 194/DIG. 26
4,221,376 10/1980  Handen et al. ................ 271/149
4,337,864  7/1982  McLean .................. 194/DIG. 26

*Primary Examiner*—Jeffrey V. Nase
*Assistant Examiner*—Jon M. Rastello
*Attorney, Agent, or Firm*—Brady, O'Boyle & Gates

[57] ABSTRACT

The pneumatic tube carrier comprises a belt conveyor with two conveyor belts (4, 5), the working faces (6, 7) of which extend in close proximity to each other from one end of the carrier to the other, for pulling, for example, a bundle of paper money (23) by frictional contact between the working faces (6, 7) into the carrier, retaining the bundle in the latter, and ejecting the bundle again from the carrier. The belt conveyor is driven, in the pneumatic tube conveyor station, via a disengageable shaft coupling, of which one coupling element (13) is arranged hidden at the carrier jacket and the other is drivable by a drive mechanism provided in the pneumatic tube conveyor station. A chamber (15) serves for accommodating hard cash, for example, this chamber exhibiting a flip lid (17) forming part of the carrier jacket (1) and equipped with a locking device, which latter is released for opening the lid (17) in the pneumatic tube conveyor station.

6 Claims, 2 Drawing Figures

U.S. Patent  Sep. 11, 1984  4,470,730

PNEUMATIC TUBE CARRIER AND PNEUMATIC TUBE CONVEYOR STATION

The invention relates to a pneumatic tube carrier and a pneumatic tube conveyor station to be used preferably but not exclusively in pneumatic tube conveyor installations employed in financial institutions for money transport between the teller's windows where the customers are served, on the one hand, and the vault, on the other hand. The purpose behind such use is the need for avoiding the accumulation of money in the area of the teller's windows for security reasons.

The periodical "geldinstitute" 1981 No. 2, pages 49 and 50, describes a pneumatic tube conveying system serving for transporting currency from the vault to the counters of a financial institution where customers are being served; currency accepted from the tellers is stored in safes set up beside each teller's window in the counter area. For the issuance of money, respectively an empty tube carrier is transported on a conveyor belt to a station in the vault. Auxiliary devices center the carrier in the station and open its lid to prepare the carrier to receive the money. An automatic paper money dispenser controlled by the commissioning teller makes the desired amount of bills available in the form of a bundle of paper money. A so-called module, driven hydraulically or pneumatically, seizes the bundle and places it in the available tube carrier. An automatic coin dispenser, likewise controlled by the commissioning teller's station, delivers the desired amount of coins which is filled into the carrier by means of a chute. A conveyor takes the carrier, containing the desired amount, to the dispatch station of a transport tube of the pneumatic tube conveyor installation, which tube leads to the commissioning teller's station.

A carrier containing coins can be turned over after opening the lid, with the opening pointing downwardly, so that the coins fall out. Normally, the carrier contains also bills in addition to the coins. In this case, it is unavoidable that coins get between the paper money on the transport path during acceleration and deceleration and along curved tube routes, and fall out only during the counting of the paper money, which is troublesome and/or leads to disturbances in the automatic counting of paper money.

The aforementioned pneumatic tube conveyor installation conveys money automatically counted in the vault to the teller's windows. In order to be able to transport money also from the teller's windows to the vault and distribute the money automatically in the vault, the tube carriers would have to be automatically emptied in the vault. This presented also the following difficulties besides the ones mentioned above: An automatic removal of bills by means of a gripper—insofar as feasible at all—would be cumbersome and would not ensure that several bills, which are not firmly held together by a suitable means or which are not held firmly enough thereby, would be seized entirely. Any bills remaining in the carrier would be further stuffed back into the carrier at the time a gripper inserts a bundle of paper money during the next charging step; the bills could hold back the coins in the carrier over a long period of time and, finally, could be pulled out only by means of a sufficiently long and slim special pair of tongs, with the risk of tearing the bills. The ensuing disturbances in the money acceptance and issuance operation of the financial institution would be considerable.

The invention is to provide a remedy. The main object of the invention is to provide a pneumatic tube conveyor carrier which is suitable for being not only loaded with but also unloaded from flat conveying material, e.g. a bill or bundle of bills, valuable papers, or other documents, quickly and reliably in the tube conveyor stations in an automatic operation in a simple manner. Another object of the invention is to provide a carrier for a pneumatic tube conveyor which can be automatically loaded as well as unloaded with flat transporting material as well as additionally with transporting material made up of pieces, for example coins, or only with transporting material of one of these two kinds, in a simple, rapid, and reliable fashion. Other and further objects of the invention reside in the structure of the pneumatic tube conveyor carrier enabling it to be automatically loaded and unloaded in the pneumatic tube conveyor station, and enabling it to remain inaccessible in the pneumatic tube conveyor system at all times.

The advantages achieved by the invention are to be seen essentially in that, for example, a bundle of paper money need not be seized by a gripper and placed into the carrier, but rather can be automatically ingested and also discharged by the carrier; during this operation, the bills of a bundle of paper money, which is not held together, remain united without change during conveyance of the carrier and while being removed therefrom so that there is no way that one or several of the bills will be left in the carrier during emptying of the latter. In a further development of the invention, also suitable for transporting hard cash, for example, no coins can enter between bills, and the carrier can be simultaneously loaded with coins and paper money, as well as simultaneously unloaded, because the bills are fed and removed at the end face of the carrier and the coins are loaded as well as unloaded at the periphery of the carrier. Also, for changing hard cash into paper money, the latter can be introduced into the carrier, and the former can be simultaneously removed from the carrier, and for changing paper money into coins, a corresponding procedure can be conducted in the reverse.

Figure 1:
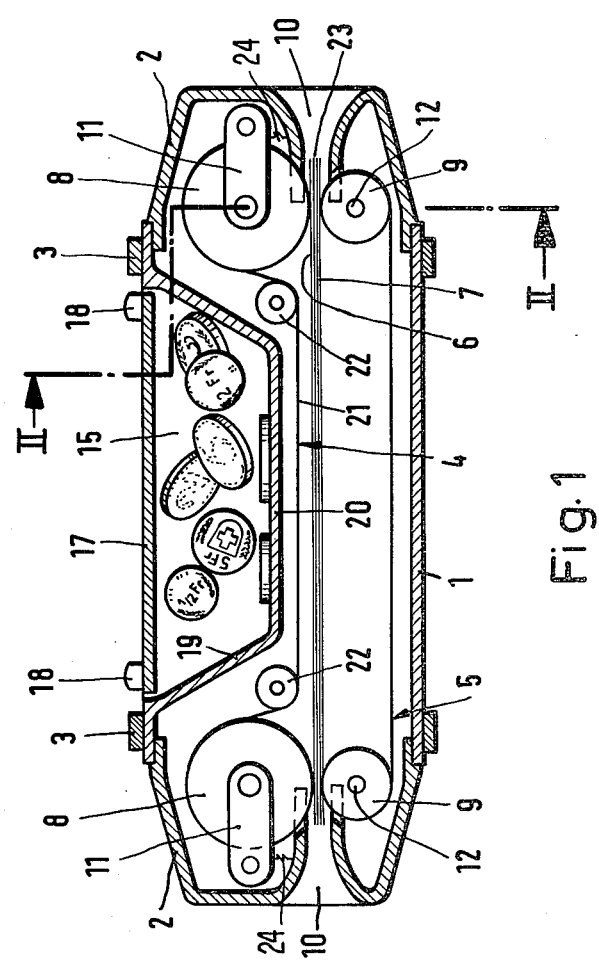

The invention will be described in greater detail hereinafter following with reference to the accompanying drawings illustrating merely one mode of carrying out the invention. In the drawings:

FIG. 1 is an axial longitudinal section view through a pneumatic tube conveyor carrier of the invention, with the flip lid shown in closed position; and FIG. 2 is an axial cross section view taken substantially along line II—II of FIG. 1, with the lid being shown in flipped open position.

The illustrated tube conveyor carrier, described hereinbelow especially in conjunction with its use for the penumatic tube transport of paper money and hard cash, consists, as is usual, of a carrier tube 1, head members 2 being mounted to the ends of this tube; the construction of these head members will be described in detail below. The carrier, as is customary, is equipped with two sealing rings 3 and can be provided with conventional scanning, contact, and digital rings, not shown, for the control and monitoring of the desired route. (In the exemplary utilization of the carrier described below, the control and monitoring operation of the carrier route is accomplished in another way.) A belt conveyor with two conveyor belts 4 and 5 is arranged in the carrier; the conveyor belts consist of a material exhibiting high adhesive friction with respect to paper money, such as, for example, the material commercially available under the trademark "Habasit" belt. The working faces 6 and 7 of the conveyor belts 4 and 5 extend in the longitudinal direction of the carrier. The guide drums 8 and 9 of the two conveyor belts 4 and 5 extend in close mutual proximity one above the other; they are drivable at the same speed in coincident directions—as will be explained further below—so that flat material fed to the end face of the carrier, for example paper money, a bundle of bills, valuable papers, or other documents, is pulled between the working faces 6 and 7 into the carrier by adhesive friction, held between these faces in the carrier when the belt conveyor is at a standstill, and is again ejected from the carrier by an appropriate drive action exerted on the belt conveyor. In this arrangement, the working faces 6 and 7 are in frictional contact with each other between the guide rollers 8 and 9 at the ends of the belt conveyor, either directly or through the interposed material. The guide drums 8 and 9 of the two conveyor belts 4 and 5 form a pair of drums 8, 9 at each end of the belt conveyor, which is arranged in one of the head members 2 so that the belt conveyor extends practically over the entire length of the carrier. A slotted opening 10 tapering in the manner of a funnel toward the nip of the drum pair 8, 9 is formed at the end face of each head member 2. The drums 8 are each mounted on a rocker arm 11 stressed by a spring 24 in the direction toward the other drum 9, so that the nip between the drums 8 and 9 automatically adapts to the thickness of the flat material. The ends of the shafts 12 of the other drum 9 are equipped each with an element 13 of a disengageable shaft coupling, in this example of a shape-mating design, so that the belt conveyor can be coupled with a drive mechanism 25 to be arranged in the transmitting as well as receiving stations, which drive mechanism 25 is equipped with a corresponding coupling element, and can be driven in one station for the ingestion of flat material into the carrier and, in another station, for the ejection of the material. The coupling elements 13 are arranged in depressions 14 of the carrier tube 1 so that they do not interfere with the travel of the carrier in the conveying tubes of the pneumatic tube conveyor system and cannot be affected with respect to their position.

A chamber 15 for piece goods, for example coins, is formed in the carrier between the drums 8; this chamber has an opening 16 sealable by a flip lid 17 held by a releasable locking device (not shown) in a closed position wherein the lid constitutes part of the carrier tube 1. The flip lid 17 can be pivoted about an axis extending along a surface line of the carrier tube and is provided with cams 18 constructed of a slip material. While the carrier travels in the conveying tube network of a pneumatic tube conveyor system, the cams 18 slide along the inside of the tube wall to keep the lid 17 reliably in a closed position, additionally to the locking action provided by the locking device. The wall 19 of the chamber 15 separates the chamber space with respect to the space occupied by the belt conveyor. In order to form a maximally large chamber space 15, the bottom 20 of the chamber has a small spacing from the working face 6, and the inactive face 21 of the conveyor belt 4 is extended by means of detour roller 22 along a detour circumventing the chamber between the chamber bottom 20 and the working face 6. The detour rollers 22 are supported in a resilient fashion so that they keep the conveyor belt 4 in a tensioned condition when one or both rocker arms yield for adapting the nip between the drums 8, 9 to the thickness of, for example, a bundle of bills, whereby the length of the detour is altered. To provide a larger chamber space 15, the working faces 6 and 7 furthermore do not run in the center of the carrier cross section but rather are arranged to be offset in a direction pointing away from the chamber 15, based on the center of the carrier cross section. The width of the conveyor belts 4 and 5 is dimensioned so that the edges of the working faces in the conveying plane have a distance from the inside of the carrier tube which is somewhat larger than the width of the conveyor belt, and the slot-like opening 10, flaring in a funnel shape toward the outside, is linear only in the zone of the conveyor belt width, but therebeyond is curved toward the plane of the chamber bottom. Consequently, paper money (or also other documents), the width of which is larger than the chord of the inside cross section of the carrier tube 1 lying in the plane of the working faces 6 and 7, is introduced into the carrier in the curved condition and held in this way therein, just as the paper money bundle 23 in FIG. 2 which is suitably supported on the outside of its curvature on a guide surface (not shown) provided in the carrier and adjoining the corresponding rim at the inner end of the slot-like opening.

The carrier suitably exhibits a marking (not shown) on the carrier tube; this marking is scanned by a scanner in a carrier holding device of the pneumatic tube conveyor stations. The scanner controls a rotary drive mechanism turning the carrier about its longitudinal axis to rotate the carrier into a position wherein the chamber opening 16, for filling the chamber, is at the top or, for emptying purposes, is at the bottom.

In the illustrated carrier, the opening 10 is provided on each of the two end faces, so that the carrier can be used for loading and unloading paper money, for example, at each end face. Depending on the design of the pneumatic tube conveyor system and its stations, for which the carrier is intended, the carrier can also be equipped with the opening 10 at only one of its end faces. Corresponding remarks apply regarding the coupling elements 13, of which only one coupling element 13 may be required, depending on the design of the drive mechanisms 25 for the belt conveyor provided in the pneumatic tube conveyor stations.

In an exemplary use of the aforedescribed pneumatic tube conveyor carrier for the pneumatic tube conveyance of bills and coins from the vault of a financial institution to the teller's windows where the customers are being served, and conversely from the teller's windows to the vault, a pneumatic tube conveyor carrier is provided for each teller's window. At the teller's window, an empty carrier (which either had brought money, previously tendered, to the teller's window or which had automatically returned after transporting money to the vault, or had returned from the vault upon a control command issued by the teller) is held in a holding means in such a way that it is freely accessible at one end face. For this purpose, a rotary drive for the carrier is provided at the holding means, this drive having a scanning device scanning the marking located on the periphery of the carrier so that the drive is arrested when the opening 16 of the carrier is at the top. In this position of the carrier, a drive mechanism 25 for the belt conveyor arranged at the holding means is automatically connected to one of the coupling elements 13, and the locking device of the carrier lid 17 is released. The teller counts the money received and transmits the amount thereof, with associated data (breakdown, number of teller's window, individual identification for the teller), to a data processing unit; he fills coins received from the customer into the chamber 15 which, with the lid 17 having been flipped open manually or automatically, is now open at the top; and recloses the lid 17, the locking means being locked in place. The paper money is piled up into a bundle by the teller and introduced into the funnel-shaped opening 10 at the freely accessible end face of the carrier. Thereby, the light beam of a light barrier, extending immediately in front of the opening 10, is interrupted, activating the drive mechanism 25, so that the belt conveyor pulls the bundle of bills between the working faces 6 and 7 into the carrier. Once the bundle of paper money has left the light beam, the drive mechanism continues operation corresponding to a conveying path analogous to the distance of the light beam from the nip between the drums 8 and 9 at the feeding side of the carrier and thereafter comes to a standstill. Then the coupling is automatically disengaged and the carrier is released for transporting to a money receiving site in the vault associated with the teller's window. During transportation, the hard cash is retained in the closed chamber 15, and the paper money bundle is firmly held between the working faces 6, 7. At the money receiving site, the carrier travels into a holding device wherein it is automatically turned so that the opening 16 is at the bottom. In this position of the carrier, the locking means of the lid 17 is released so that the lid flips open downwardly under its own weight and the coins fall from the chamber 15 into a dish from which a chute leads to a coin sorting and counting automat. At the same time, the coupling element of a drive mechanism 25 arranged at the money receiving site is coupled with one of the coupling elements 13, and the drive mechanism is activated to eject the bundle of paper money until a light barrier, the light beam of which extends on the ejection side of the carrier, responds to the fact that the paper money bundle has left the carrier. The thus-ejected bills are sorted and counted by an automatic device. The counted amount of coins and bills is suitably transmitted to a data processing unit. The latter checks whether this amount coincides with the amount indicated by the teller, and transmits an appropriate signal to the teller's window.

To issue money, the teller transmits to the data processing unit the desired amount, the desired breakdown, and further data. In correspondence with the data, an automatic money issuing device associated with the teller's window is actuated in the vault and loads coins and paper money simultaneously into the carrier. The carrier is released for transport to the teller's window. At the teller's window, the carrier is emptied in the same way as described for emptying in the vault, with the difference that relatively small amounts are normally recounted by hand at the teller's window.

As can be seen, the carrier remains permanently within the system; it need not be removed, and the system can be designed so that the carriers cannot be readily taken out. This prevents damage to the carriers and to the stations by erroneous manipulations. (Disturbances by operating errors can be avoided by switching measures taken by the control devices.) Finally, unauthorized access can be prevented in that each station, including the processes which can be triggered by this station in the vault, is blocked in the inactive condition and can be unblocked only with the aid of a key or a scannable identification card of the teller, the distinguishing symbol of which, together with the accounting data, is recorded in the data processing unit during each transaction.

Also the coins and bills received at the teller's window can be automatically counted and introduced into the carrier; in this connection, the amount is suitably first indicated after counting, and the money is introduced automatically into the carrier only after a permission key has been actuated.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

What is claimed is:

1. A pneumatic tube carrier, comprising an enclosing carrier wall (1), end faces at opposite ends of said carrier wall, a belt conveyor assembly with two conveyor belts (4, 5) having working faces (6, 7) which extend in close superposition to each other and which extend in the longitudinal direction of the carrier, at least one of said end faces having a feed slot (10) in registration with said working faces (6, 7) of said two conveyor belts (4, 5), said two conveyor belts adapted to be driven at the same speed in respectively coincident directions, in order to pull flat material, fed to the feed slot (10) in at least one end face of the carrier, into the carrier by adhesive friction between the working faces (6, 7) and to push such material out of the carrier, and to retain thus-ingested material between the working faces (6, 7) when the belt conveyor assembly is at a standstill; a chamber (15) for piece goods formed in the carrier and separated from the space occupied by the belt conveyor assembly (4–9, 10–13), a lid (17) formed in part of the carrier wall (1) closing said chamber (15), a releasable locking device for holding said lid in closed position, at least one drive shaft (12) connected to the belt conveyor assembly, and an element (13) of a shaft coupling, on said at least one drive shaft adapted for coupling to a mating coupling element drivable by a drive mechanism.

2. A pneumatic tube carrier, comprising an enclosing carrier wall (1), end faces at opposite ends of said carrier wall, a belt conveyor assembly with two conveyor belts (4, 5) having working faces (6, 7) which extends in close superposition to each other and which extend in the longitudinal direction of the carrier, at least one of said end faces having a feed slot (10) in registration with said working faces (6, 7) of said two conveyor belts (4, 5), said working faces (6, 7) of the two conveyor belts having longitudinal edges, said two conveyor belts adapted to be driven at the same speed in respectively coincident directions, in order to pull flat material, fed to the end face of the carrier, into the carrier by adhesive friction between the working faces (6, 7) and to push such material out of the carrier, and to retain thus-ingested material between the working faces (6, 7) when the belt conveyor assembly is at a standstill; said longitudinal edges of said working faces spaced from the inside surface of said enclosing carrier wall (1), as measured in the conveying plane, a distance greater than the width of said conveyor belts (4, 5), said feed slot (10) being curved outside of the region of the conveyor belt width, a feeding funnel being connected outwardly of said feed slot to said at least one end face, at least one drive shaft (12) connected to the belt conveyor assembly, and an element (13) of a shaft coupling, on said at least one drive shaft adapted for coupling to a mating coupling element drivable by a drive mechanism.

3. A pneumatic tube carrier, comprising an enclosing carrier wall (1), end faces at opposite ends of said carrier wall, a belt conveyor assembly with two conveyor belts (4, 5) having working faces (6, 7) which extend in close superposition to each other and which extend in the longitudinal direction of and approximately the entire length of the carrier, at least one of said end faces having a feed slot (10) in registration with said working faces (6, 7) of said two conveyor belts (4, 5), said two conveyor belts adapted to be driven at the same speed in respectively coincident directions, in order to pull flat material, fed to the feed slot (10) in a least one end face of the carrier, into the carrier by adhesive friction between the working faces (6, 7) and to push such material out of the carrier, and to retain thus-ingested material between the working faces (6, 7) when the belt conveyor assembly is at a standstill; first (8) and second (9) pairs of guide drums respectively supporting said two conveyor belts (4, 5) at opposite ends, rocker arm means (11) connecting said first pair of guide drums (8) supporting one (4) of the two conveyor belts to the carrier, means connected to resiliently bias said rocker arm means (11) toward the other conveyor belt (5) of said two conveyor belts, at least one drive shaft (12) connected to the belt conveyor assembly, and an element (13) of a shaft coupling, on said at least one drive shaft adapted for coupling to a mating coupling element drivable by a drive mechanism.

4. A carrier according to claim 1, including a depression in the carrier wall (1), and said at least one drive shaft (12) connected to drive at least one of the guide drums of said pairs of guide drums (8, 9) at the ends of the belt conveyor assembly, and said coupling element (13) on the end of said at least one drive shaft (12) arranged in said depression in the carrier wall (1).

5. A carrier according to claim 1, in which the lid is pivotable about an axis extending alongside a surface line of the carrier wall (1), and a pair of cams (18) of a slip material on the outside of said lid adapted for traveling along the inside of the conveying tubes of the pneumatic tube conveyor system.

6. A carrier according to claim 1, in which the chamber has a bottom wall (20) that extends into a central zone of the carrier cross section, and which extends parallel to the conveying plane of the belt conveyor assembly, the working faces (6, 7) of the two conveyor belts (4, 5) being offset from the longitudinal axis of the carrier, the conveyor belt (4) adjacent to said chamber (15) having an inactive face (21) adjacent the bottom wall (20) of the chamber, and a pair of detour rollers (22) in said carrier connected to guide said inactive face (21) along an offset path circumventing the chamber (15).

* * * * *